(12) United States Patent
Maeda et al.

(10) Patent No.: US 6,270,917 B1
(45) Date of Patent: Aug. 7, 2001

(54) FUEL CELL

(75) Inventors: Hideo Maeda; Kenro Mitsuda; Hisatoshi Fukumoto; Kazutoshi Kaneyuki, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/376,049

(22) Filed: Aug. 17, 1999

(30) Foreign Application Priority Data

Mar. 16, 1999 (JP) .................................................. 11-069590

(51) Int. Cl.$^7$ .............................. H01M 8/02; H01M 8/04
(52) U.S. Cl. .................................................. 429/37; 429/38
(58) Field of Search ........................................... 429/34–39

(56) References Cited

U.S. PATENT DOCUMENTS

| | | | |
|---|---|---|---|
| 3,607,425 | * 9/1971 | Titterington et al. | |
| 5,484,666 | 1/1996 | Gibb et al. | 429/34 |
| 6,159,629 | * 12/2000 | Gibb et al. | 429/39 |

FOREIGN PATENT DOCUMENTS

| | | |
|---|---|---|
| 5-94831 | 4/1993 | (JP) . |
| 8-306381 | 11/1996 | (JP) . |
| 2000-123857 | * 4/2000 | (JP) . |

* cited by examiner

*Primary Examiner*—Stephen Kalafut
*Assistant Examiner*—Jonathan Crepean
(74) *Attorney, Agent, or Firm*—Leydig, Voit & Mayer, Ltd

(57) ABSTRACT

The long side of a rectangular first separator plate of a fuel cell is divided into n equal area smaller rectangular parts so that the long sides of the rectangular parts are not larger than $2^{1/2}$ and not smaller than $\frac{1}{2}^{1/2}$ the length of the short sides. Through holes pass through a stack of plates substantially at centers of the smaller rectangles. Bolts having an annular elastic member at one end pass through the through holes, and the stack is clamped together.

14 Claims, 14 Drawing Sheets

RELATIONSHIPS BETWEEN FUEL UTILIZATION FACTOR AND AVERAGE CELL VOLTAGE

FUEL CELL

BACKGROUND OF THE INVENTION

1. Field of the Invention

The present invention relates to an improvement of a fuel cell which is useful in an electric vehicle and the like.

2. Description of the Related Art

A fuel cell is a device in which a pair of electrodes are contacted with each other via an electrolyte, fuel is supplied to one of the electrodes, an oxidant is supplied to the other electrode, and the fuel in the fuel cell is electrochemically oxidized whereby chemical energy is directly converted into electrical energy. According to the kind of the electrolyte, fuel cells are classified into several kinds including a so-called solid polymer fuel cell in which a solid polymer electrolyte membrane is used as an electrolyte, and a phosphoric acid fuel cell in which phosphoric acid is used. Recently, a solid polymer fuel cell received attention as a fuel cell which can output high power. Therefore, a solid polymer fuel cell will be described as an example.

In a solid polymer fuel cell, when hydrogen gas is supplied to an anode, and oxygen gas is supplied to a cathode, and a current is output to an external circuit, the following reactions occur:

anode reaction: $H_2 \rightarrow 2H^+ + 2e^-$ (1)

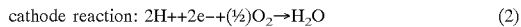

cathode reaction: $2H^+ + 2e^- + (½)O_2 \rightarrow H_2O$ (2)

At this time, hydrogen on the anode is converted to a proton and then moves together with water onto the cathode. The hydrogen reacts with oxygen on the cathode to produce water. When such a fuel cell is to be operated, therefore, the fuel cell must have a structure in which sufficient supply of the reactant gasses, discharge of the produced water, and output of the current are enabled. Various kinds of such structures have been proposed.

FIG. 15 is a sectional view showing a basic configuration of a unit cell constituting a fuel cell. In the figure, 1 denotes a first separator plate which is electrically conductive and on which groove-like oxidant flow paths 10 are engraved, 2 denotes a second separator plate which is electrically conductive and on which groove-like fuel flow paths 11 are engraved, 3 denotes a cathode, 4 denotes an anode, and 5 denotes an electrolyte membrane in which, for example, a proton-conductive solid polymer is used. As described above, various structures for a separator plate of a fuel cell having a thus configured section have been proposed. FIG. 16 is a top view of a separator plate which is similar to that disclosed in, for example, Japanese Patent Publication (Kokai) No. HEI3-205763.

In the figure, 10 denotes plural oxidant flow paths which are formed in one face of the first separator plate 1 in a meandering form, or on the side of the face contacted with the cathode 3, in order to supply an oxidant gas to the cathode 3. For example, oxygen gas or air is used as the oxidant gas. In FIG. 16, the oxidant flow paths 10 elongate in a meandering form so as to have a large length, whereby the gas flow rate is increased, and are made shallow so as to expedite diffusion of gasses required for reaction. As a result, water produced in the cathode 3 is efficiently discharged.

The reference numeral 31 denotes the principal face of the first separator plate 1, 32 denotes an electrode support portion which supports the cathode 3, 24 denotes an air supply port which is formed in the first separator plate 1 and through which air is supplied, and 25 denotes an air discharge port through which air is discharged. Although not shown in the figure, also the second separator plate 2 has a similar structure and is provided with meandering fuel gas flow paths 11 in place of the oxidant flow paths 10. Each oxidant flow path 10 is configured by a space defined by the groove of the first separator plate 1 and the cathode 3, and each fuel gas flow path (also referred to as the fuel flow path) 11 is configured by a space defined by the groove of the second separator plate 2 and the anode 4. For example, hydrogen gas is used as the fuel gas which flows through the fuel flow path 11.

Next, the operation will be described. The oxygen gas which is fed through the air supply port 24 of the first separator plate 1 is supplied to the cathode 3 through the plural oxidant flow paths 10 which elongate in parallel. By contrast, the hydrogen gas (fuel gas) is supplied to the anode 4 through the fuel gas flow paths 11. At this time, the cathode 3 and the anode 4 are electrically connected outside the fuel cell to each other via a load. Therefore, reaction (2) occurs on the side of the cathode 3, and unreacted gas and water are discharged to the air discharge port 25 through the oxidant flow paths 10. On the other hand, reaction (1) occurs on the side of the anode 4, and unreacted gas is discharged through the fuel gas flow paths 11 and a fuel discharged port (not shown). Electrons which are obtained as a result of this reaction flow through the electrodes 3 and 4, the electrode support portion 21, and the first and second separator plates 1 and 2.

The separator plates and the electrodes are stacked and then brought into contact under pressure by applying a load. In order to cause the fuel cell to efficiently operate, the reaction distribution in the face of one separator must be made as uniform as possible. Therefore, the load which is applied to the cell face must be made uniform. FIG. 17 shows a technique disclosed in U.S. Pat. No. 5,484,666. In the figure, 100 denotes a stack of single cells such as shown in FIG. 15, 35 denotes through holes which are formed in the cell stack 100, 36 denotes bolts which are passed through the through holes 35, 37 denotes disc springs which are attached to ends of the bolts 36, 39 denotes end plates which are attached to ends of the cell stack 100, and 50 denotes cavities which are formed in the end plates 39 so as to accommodate the disc springs 37.

In FIG. 17, many (in the figure, four) bolts 36 are disposed ir the face of the cell stack 100 so as to make the load uniform. However, the formation of many holes in the electrode faces complicates the gas flow paths, and increases the number of gas sealing portions, thereby increasing area loss.

Each of the plural oxidant flow paths 10 and fuel gas flow paths 11 is configured as a single flow path from the inlet to the outlet or has no ramification such as a branch or a junction. When even one portion in the midpoint of the flow path is clogged, therefore, the gas is not newly supplied in the whole of the flow path or in the entire range from the inlet to the outlet, so that the function of the whole of the flow path is disabled. As a result, the power generation capacity is naturally lowered.

Each of the cells is structured so as to independently receive supplies of a fuel gas and an oxidant gas. When the function of the flow paths is partly lowered in even one of the stacked cells so that the fuel is deficient in the one cell, a reaction indicated by the following formula occurs in the electrode:

$C + 2H_2O \rightarrow CO_2 + 4H^+ + 4e-$ (3)

As a result, carbon in components of the fuel cell, such as the electrodes and the separators is corroded and the electrodes and the like suffer fatal damage, with the result that the power generation capacity of the whole fuel cell is extremely reduced.

In a fuel cell of the conventional art, as described above, many bolts are used in order to make uniform the face pressure. Therefore, the effective area of each separator is reduced, thereby producing a problem in that the power generation efficiency is lowered.

Each cell is structured so as to independently receive supplies of a fuel gas and an oxidant gas. When fuel gas is deficient in even one cell, therefore, carbon is corroded causing a fear that cells will be fatally damaged.

Each of oxidant flow paths and fuel gas flow paths is configured as a single flow path from the inlet to the outlet or has no ramification such as a branch or a junction. When even one portion in the midpoint of such a flow path is clogged, therefore, the gas is not newly supplied in the whole of the flow path or in the entire range from the inlet to the outlet, thereby producing a problem in that the function of the whole of the flow path is disabled.

SUMMARY OF THE INVENTION

The invention has been made in order to solve the above-discussed problems. It is an object of the invention to provide a fuel cell in which the number of bolts per unit area can be reduced and the face pressure can be maintained uniform.

It is another object of the invention to provide a fuel cell in which, even when a flow path is clogged at a midpoint, the function of the whole of the flow path is not disabled.

It is a further object of the invention to provide a fuel cell in which a shortage of a fuel hardly occurs in a single cell, and, even when such a shortage occurs, carbon is corroded in a lesser degree as compared with the conventional art.

The fuel cell of the invention comprises: a rectangular single cell in which a rectangular electrolyte film is sandwiched between a cathode and an anode which are substantially identical in shape with the electrolyte film, a ratio of a length of a long side to a length of a short side in the electrolyte film being $2^{1/2}$ or more; a stack comprising: a first separator plate disposed adjacent to the cathode and having oxidant flow paths through which an oxidant fluid is supplied; and a second separator plate disposed adjacent to the anode and having fuel flow paths through which a fuel fluid is supplied; thorough holes which are respectively formed at substantially center areas of plural second rectangles, the through holes passing through the stack, the rectangles being formed as a result of dividing a long side of the single cell of the stack into n equal parts, the n being selected so that the parts are not larger than $2^{1/2}$ times a length of the short side and not smaller than $\frac{1}{2}^{1/2}$ times; and bolts which pass through the through holes, respectively, which have an annular elastic member in at least one end, and which fasten the stack via the annular elastic member.

When the long side of the rectangular single cell of the stack is divided into n equal parts, the parts are not larger than $2^{1/2}$ times a length of the short side and not smaller than $\frac{1}{2}^{1/2}$ times is selected as the n.

An outer diameter of the annular elastic member is not larger than 90% of a short side of the second rectangles which are obtained as a result of the division, and not smaller than 50% of a long side of the second rectangles.

The annular elastic member is a member in which disc springs of two or more kinds and having different outer diameters are coaxially attached.

A ratio of quotients of divisions in which spring constants of the disc springs having different outer diameters are divided by respective outer diameters is in a range from 1 to 0.8, to 1 to 1.2.

A diameter of the bolt passing through corresponding one of the through holes is smaller than a diameter of an inner wall of corresponding one of the through holes, whereby a gas communication path through which fuel flow paths of different separator plates are connected to one another or oxidant flow paths of different separator plates are connected to one another is formed between the inner wall and the bolt.

Oxidant flow paths of a same separator plate communicate with one another through the gas communication path or fuel flow paths of a same separator plate communicate with one another through the gas communication path.

DETAILED DESCRIPTION OF THE PRESENT INVENTION

The present invention will be described in detail with reference to the accompanying drawings.

EMBODIMENT 1

Figure 1:
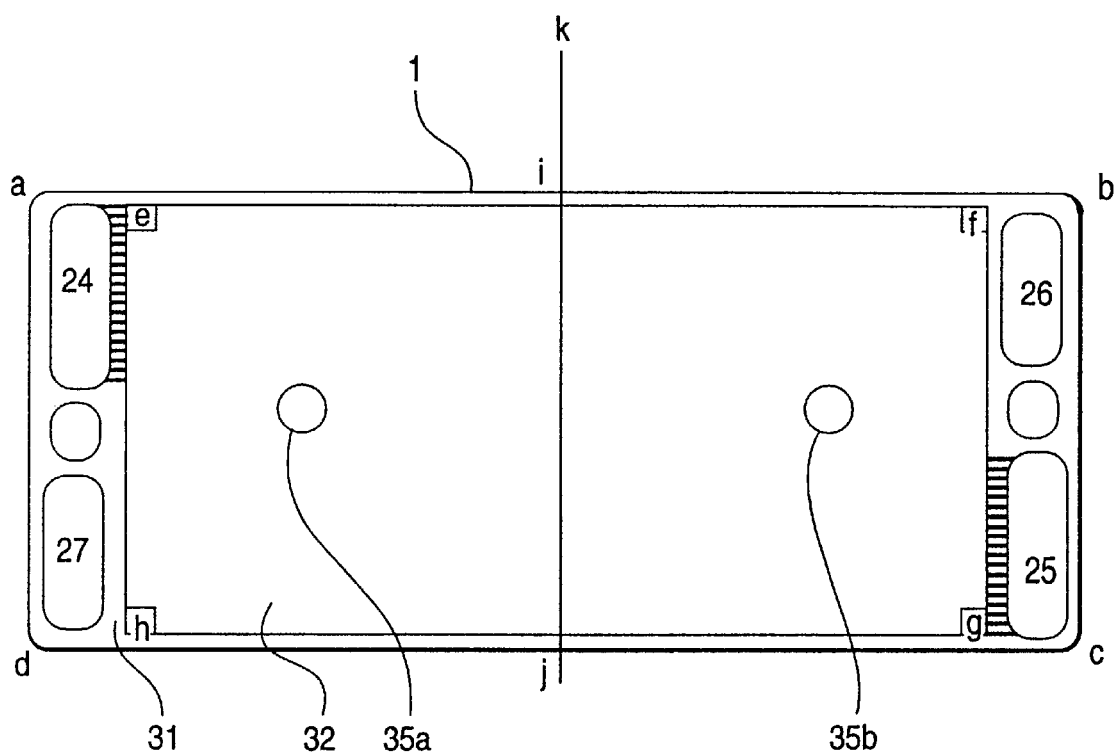
FIG. 1 is a view showing the configuration of a separator plate of a fuel cell of Embodiment 1 of the invention.

FIG. 1 shows the configuration of a first separator plate 1 of a fuel cell of Embodiment 1 of the invention. In figures which will be described later, the same reference numerals as those of the figures of the conventional art example denote identical or equivalent components, respectively. Therefore, detailed description of those components is omitted. In FIG. 1, 31 denotes the principal face of a separator plate, and 32 (the portion indicated by the symbols "e", "f", "g", and "h" in the figure) denotes an electrode support portion. Plural grooves (not shown) that, when the separator plate is stacked on a single cell, form gas flow paths (also referred to as oxidant flow paths) through which air serving as an oxidant flows are disposed in the electrode support portion. The reference numeral 24 denotes an air supply port through which air (also referred to as an oxidant fluid) serving as an oxidant is supplied, 25 denotes an air discharge port, 26 denotes a fuel supply port through which a fuel gas (also referred to as a fuel fluid) is supplied, and 27 denotes a fuel discharge port.

The flat face of the first separator plate 1 is involved in the rectangle "abcd" (for example, 240×120 (the unit is mm and this unit is applicable also to the following values having no unit)) in FIG. 1. The effective electrode area (identical with the electrode support portion 32) is involved in the rectangle "efgh" (for example, 220×110). In the embodiment, a ratio of the length of a long side to that of a short side is 2 to 1. The line "k" divides the long sides "ab" and "dc" of the rectangle "abcd" into two equal parts. Through holes 35a and 35b are formed at the centers of the rectangles "aijd" and "ibcj" (each of the rectangles is referred to as a second rectangle) which are formed as a result of the division, respectively.

The second separator plate 2 is structured in substantially the same manner as FIG. 1, and hence is not illustrated. The through holes 35a and 35b are formed at the centers of the second rectangles which are formed as a result of dividing the long side into two equal parts, respectively.

Figure 2:
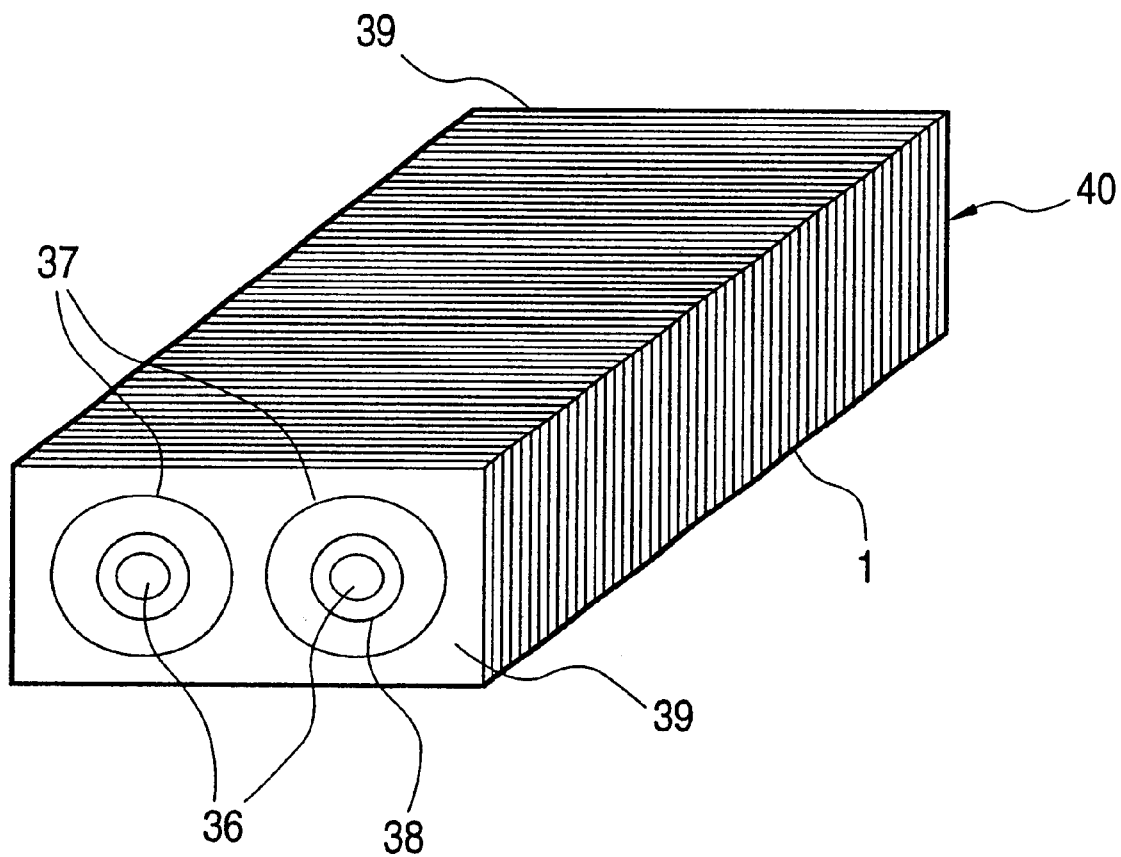
FIG. 2 is an external perspective view of a fuel cell stack which is assembled by using the separator plate of FIG. 1.

FIG. 2 is an external perspective view of a fuel cell stack 40 in which the first and second separator plates 1 and 2 are used and which is configured by stacking single cells and the like. In the figure, 36 denotes bolts which pass through the through holes 35a and 35b. The bolts are configured by, for example, applying an insulation film on bolts made of SUS. Even when a certain force acts on the member during operation and the bolts are contacted with the separators, therefore, no electrical short circuit occurs. In each of the flow paths for the fluids, a seal is provided between the flow path and the through holes 35a and 35b, so as to prevent the fluids from leaking into the through holes. The reference numeral 39 denotes end plates which are attached to ends of the stack configured by the stacked separator plates and the like. Although not shown in the figure, each of the end plates is provided with ports which are directly connected to the air supply port 24 and the air discharge port 25 through which air is to be passed, and the fuel supply port 26 and the fuel discharge port 27 through which the fuel is to be passed.

Figure 3:
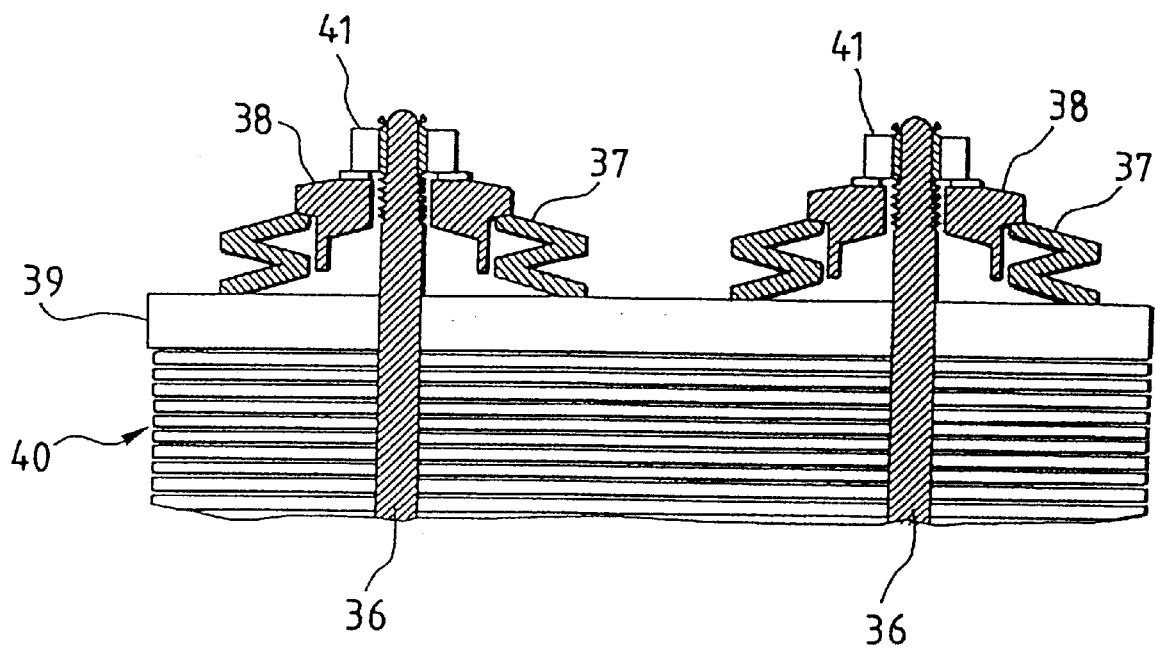
FIG. 3 is a sectional view of the fuel cell of FIG. 2.

As shown in FIG. 3, annular elastic members 37 each of which is configured by stacking three disc springs of an outer diameter of 90, an inner diameter of 46, and a thickness of 3.5 are attached via adaptors 38 to ends of each of the bolts 36 so that the outer diameter portions of the annular elastic members abut against the vicinity of the outer periphery of the fuel cell stack 40, respectively. The ends are on the sides of the ends of the fuel cell, respectively. The fuel cell stack 40 is fastened via the end plates 39 by using nuts 41. In the above, the configuration in which the first separator plate 1 is divided into two equal parts has been described. When the separator plate has a large long side, the plate is divided into n equal parts (n is an integer). Hereinafter, a method of selecting n will be described with reference to examples.

EXAMPLE 1

Figure 4:
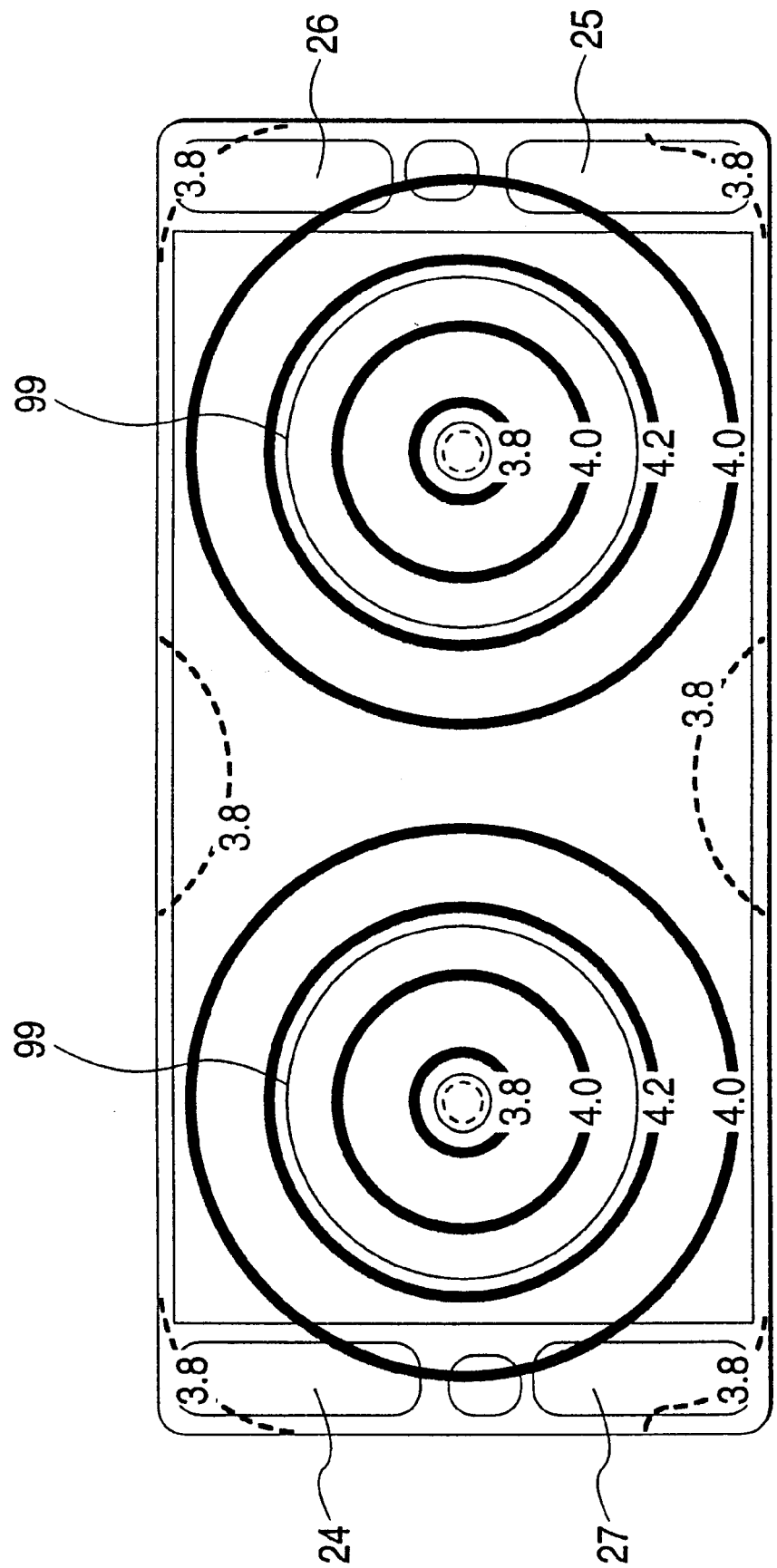
FIG. 4 is a diagram showing the face pressure distribution of the fuel cell of FIG. 3.

When the fuel cell stack 40 having the above-mentioned dimensions was fastened so that the annular elastic members 37 were deformed by 1.8 mm, the fastening load acting on the stack reached 1.15 tons. Namely, an average face pressure of 4 $kgf/cm^2$ was applied to the stack. At this time, a face pressure sensor was temporarily inserted between the first separator plate 1 and the corresponding end plate 39 to measure dispersion of the load. FIG. 4 shows results of the measurement. In the figure, 99 denotes description lines indicating positions where the outer diameter portions of the annular elastic members 37 abut against the end plate. In FIG. 4, the face pressures in all measurement places on the first separator plate 1 are within the range of ±0.2 $kg/cm^2$. The sensor was detached from the stack, the stack was then reassembled, and the stack was actually operated. As a result, an average cell resistance multiplied by the electrode area was 65 $m\Omega cm^2$ or maintained at a value which is smaller by 10% or more than that in the case where the stack was fastened in only the peripheral portion in the same manner as the conventional art. Also the cell performance was 0.68 V at 500 $mA/cm^2$ under the hydrogen/air and atmospheric conditions or was improved by nearly 20 mV.

EXAMPLE 2

Figure 5:
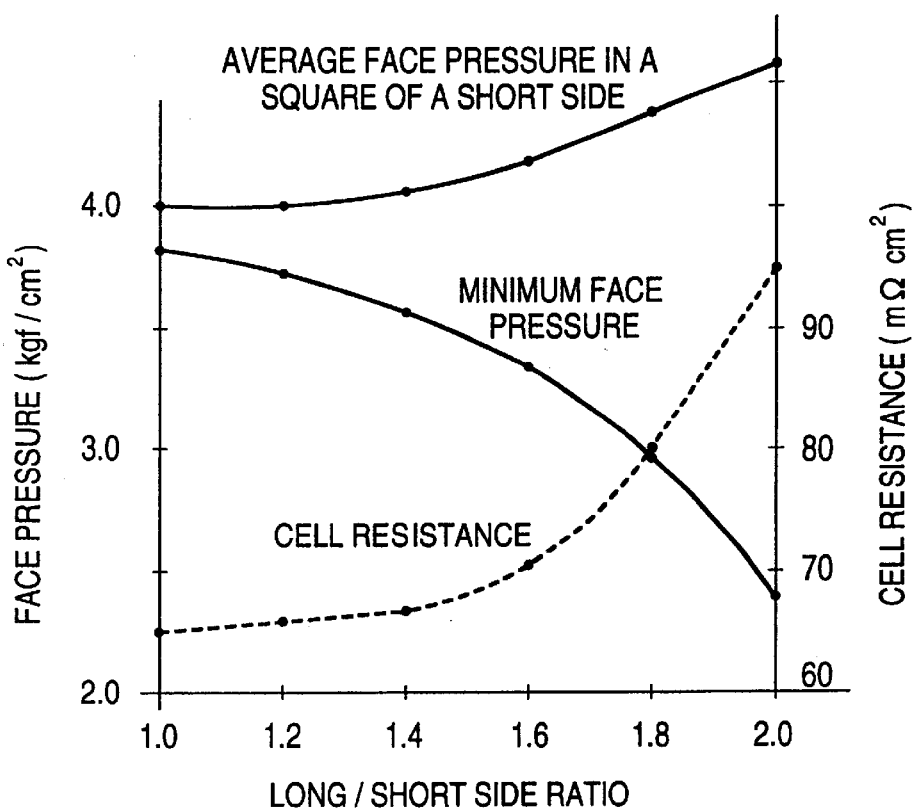
FIG. 5 is a graph illustrating relationships between variation of the long/short side ratio and the cell performance.

Next, single cells were stacked with separator plates of five kinds in which the length of the short side is equal to that of Example 1 and only the long side is varied. While applying the same average face pressure as that which was applied to the fuel cell stack 40 (10-cell stack), the face pressure distribution, the cell resistance, and the cell performance were measured. Results of the measurement are listed in Table 1 below, and shown in the form of a graph in FIG. 5. The long side/short side ratio is gradually increased from 1 in the case A to 2 in the case F. From the results, it will be seen that a large change is not observed until the long/short side ratio reaches 1.4, but, when the ratio exceeds 1.4, the face pressure distribution, the cell resistance, and the cell performance are remarkably lowered. This tendency was observed also in cases where the short side serving as a reference has a different length (they are configured so as to have a substantially identical ratio of the outer diameter of the annular elastic members 37 and the length of the short side).

TABLE 1

LONG/SHORT SIDE RATIO, FACE PRESSURE DISTRIBUTION, AND CELL RESISTANCE (average face pressure: 4 $kgf/cm^2$)

| case | Long/short side ratio (-) | Average face pressure in a square of a short side ($kgf/cm^2$) | Minimum face pressure ($kgf/cm^2$) | Cell Resistance ($m\Omega cm^2$) | Average Cell Voltage (V) |
|---|---|---|---|---|---|
| A | 1.0 | 4.0 | 3.8 | 65 | 0.680 |
| B | 1.2 | 4.0 | 3.7 | 66 | 0.678 |
| C | 1.4 | 4.1 | 3.6 | 67 | 0.675 |
| D | 1.6 | 4.2 | 3.3 | 71 | 0.666 |
| E | 1.8 | 4.4 | 3.0 | 80 | 0.648 |
| F | 2.0 | 4.6 | 2.4 | 95 | 0.607 |

In the case where the long/short side ratio before division is smaller than $2^{1/2}$, when the long side is divided into two equal parts, the long/short side ratio after the division is larger than that before the division. The vicinity of the length relationship in which the long/short side ratio of the second rectangle after division is $2^{1/2}$ coincides with that of a boundary of a region where the cell performance can be maintained to a high level. Therefore, the division number can be determined depending on judgement whether the original long/short side ratio before division is smaller than $2^{1/2}$ or not.

In the embodiment, the outer diameter of the annular elastic members 37 was set to 90 mm which is equal to 75% of the short side of a rectangle which is obtained as a result of division of the separator plate. Separator plates of different long/short side ratios were checked by using several diameters. As a result, in the case where the long/short side ratio of the second rectangle after division was as large as 1.4, the cell performance could be maintained to a high level when the outer diameter of the annular elastic members 37 was in the range of 90% or smaller of the short side and 50% or larger of the long side. In the case where the long/short side ratio is 1, a high performance was obtained when the outer diameter was in the range of 40 to 90% of the rectangle (square). When the outer diameter was in the range of 90% or smaller of the short side and 50% or larger of the long side, a high performance was obtained at any long/short side ratio.

In the above, the configuration in which the long side is obtained by dividing the whole length of the separator plate 1 into equal parts has been described. In the case where the dimensions of the spaces such as the air supply port 24 are not relatively greatly large as compared with the length of the electrode support portion, substantially the same result is attained even when the long side of the electrode support portion is divided into equal parts. In this case, even when the ratio of one of the separator plate and the electrode support portion exceeds $2^{1/2}$, a high performance can be obtained if the ratio is up to 1.6 and the ratio of the other one of the separator plate and the electrode support portion is not larger than $2^{1/2}$.

EMBODIMENT 2

Figure 6:
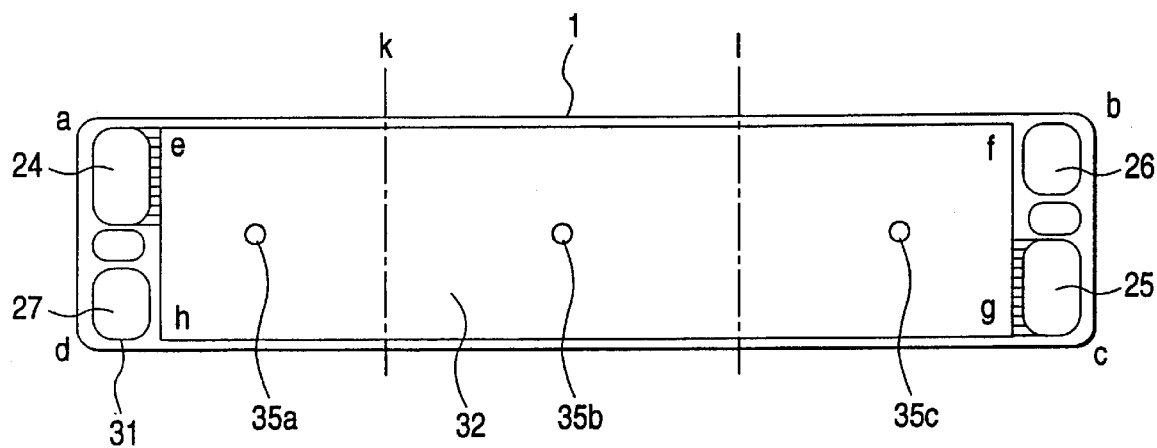
FIG. 6 is a view showing the configuration of a separator plate of a fuel cell of Embodiment 2.

FIG. 6 shows the configuration of a first separator plate 1 of a fuel cell of Embodiment 2. In order to describe the manner of selecting the division number, the figure shows the case where the aspect ratio is particularly large. In the figure, the short side is equal to that of Embodiment 1 shown in FIG. 1, the long side of the electrode support portion ("ef") is 380 mm, and that of the separator portion ("ab") is 460 mm. In the portions, the ratios of the long side to the short side are 3.45 and 3.83. In FIG. 6, through holes 35a, 35b, 35c were formed at the centers of rectangles which were formed by dividing the long sides "ab" and "cd" of the rectangle "abcd" into three equal parts by lines "k" and "l". In the same manner as FIG. 3, annular elastic members 37, each of which was configured by stacking three disc springs of an outer diameter of 90, an inner diameter of 46, and a thickness of 3.5 were disposed via adaptors 38 in each of the through holes 35 so as to be placed at ends of the cell stack, respectively.

When the fuel cell stack was fastened via end plates 39 by using nuts 41 so that the annular elastic members 37 were deformed by 2.6 mm, the fastening load was 2.2 tons, and an average face pressure of 4 kg/cm² was applied to the stack. The dispersion of the load was ±0.2 kg/cm². In an actual operation, an average cell resistance multiplied by the electrode area was 67 mΩcm² or maintained at a small value in the same manner as Embodiment 1. Also the cell performance was as high as 0.68 V at 500 mA/cm² under the hydrogen/air and atmospheric conditions. Although not shown in the figures, also the second separator plate 2 has the same dimensions and shape.

When the rectangle "abcd" of a separator plate of the same dimensions and shape is sectioned by dividing the long sides "ab" and "dc" and through holes 35 are respectively formed at the centers of the resulting rectangles, the long/short side ratio of the rectangles is 1.04 (the relationship of the long and short sides is inverted) or has a preferable value. Therefore, an excellent face pressure distribution is obtained, but the cell performance is not substantially improved. This is caused by the reduction of the effective electrode area due to the formation of the through holes 35. Preferably, the number of the through holes 35 is not increased to a value larger than the required one. In other words, the configuration in which division is conducted at the minimum division number at which the long/short side ratio is not larger than $2^{1/2}$, the through holes 35 are formed at the centers of rectangles obtained as a result of the division, and then the cell stack is fastened is effective in improvement of the performance of the cell stack.

EMBODIMENT 3

Figure 7:
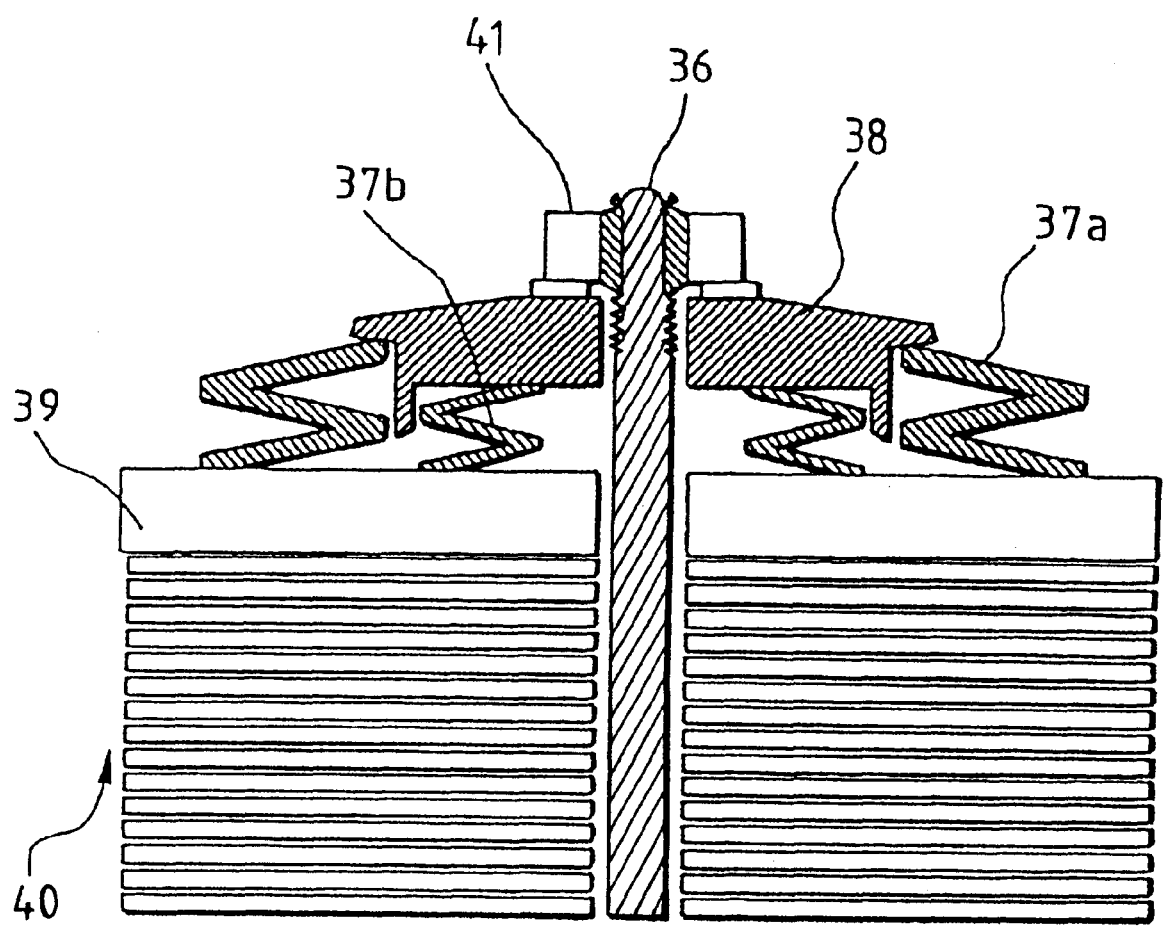
FIG. 7 is a sectional view of a fuel cell of Embodiment 3.

The structure of a fuel cell of Embodiment 3 will be described with reference to FIG. 7. FIG. 7 is a sectional view of a fastening structure of a fuel cell stack. In the figure, only one of squares (120 mm square) which is obtained by dividing a first separator plate 1 is shown, and the other squares are not shown. An annular elastic member 37a is configured by stacking three disc springs of an outer diameter of 112, an inner diameter of 57, and a thickness of 4.0, and an annular elastic member 37b is configured by stacking three disc springs of an outer diameter of 50, an inner diameter of 25.4, and a thickness of 1.9. At a deformation of 1 mm, in the annular elastic member 37a, a load of 350 kg is applied, and, in the annular elastic member 37b, a load of 150 kg is applied. The fuel cell stack is fastened via end plates 39 by using adaptors 38 and nuts 41.

Figure 8:
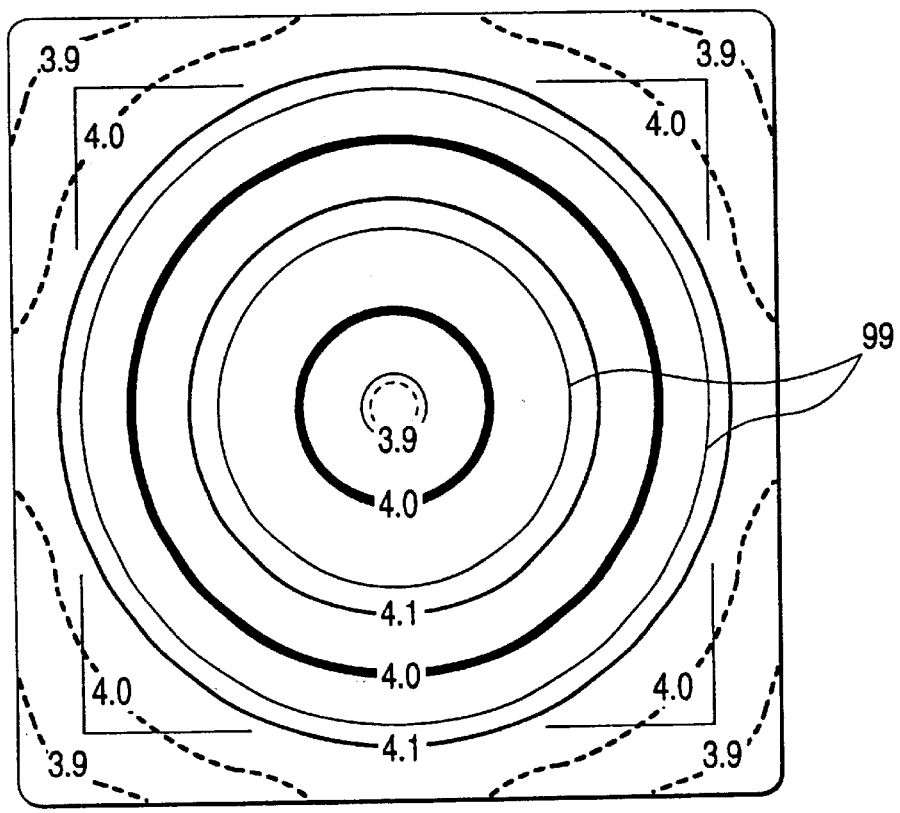
FIG. 8 is a diagram showing the face pressure distribution of the fuel cell of FIG. 7.
Figure 9:
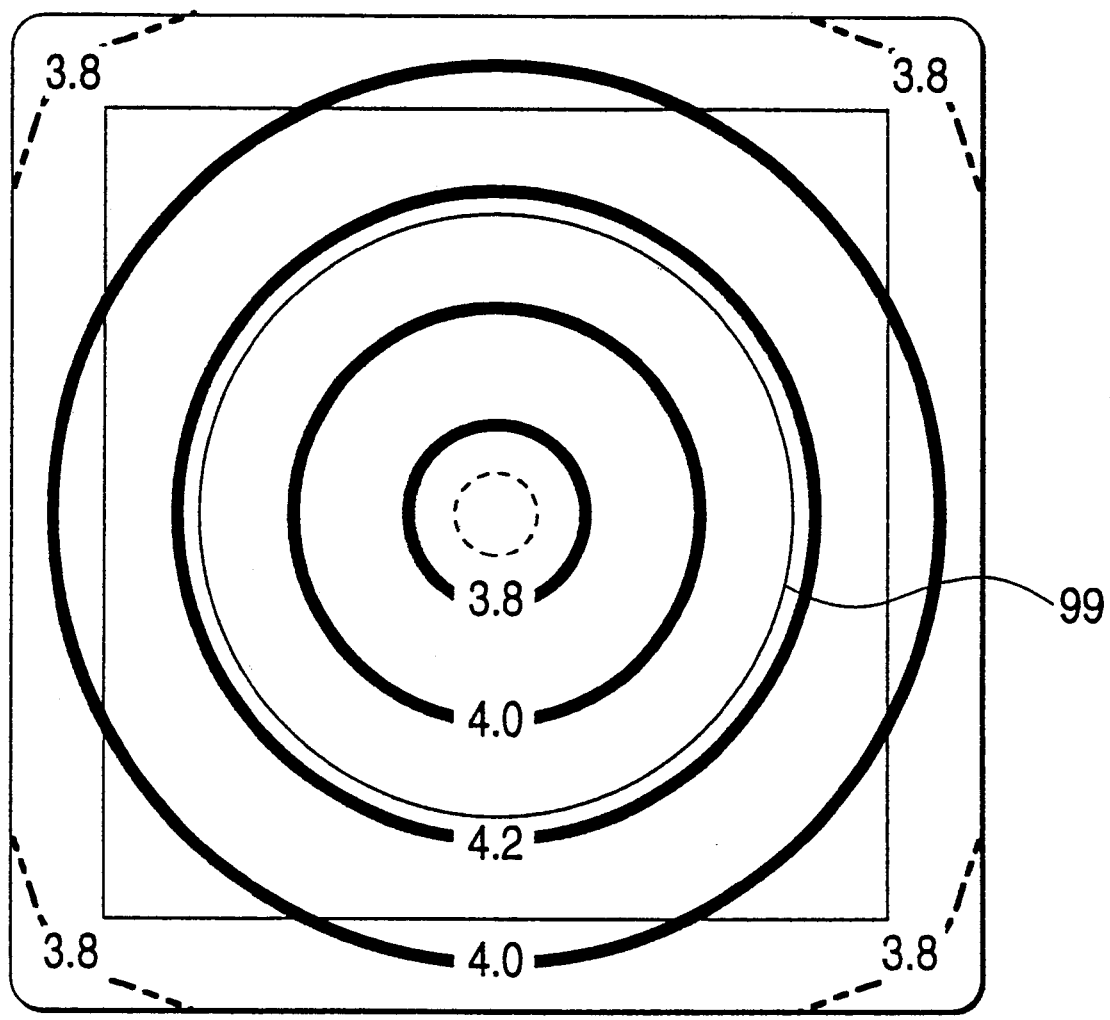
FIG. 9 is a diagram showing the face pressure distribution in the case where annular elastic members of one kind were used.

When the fuel cell stack was fastened so that the annular elastic members 37 were deformed by 1.15 mm, the fastening load of 580 kgf was applied to the stack, or an average face pressure of 4 kg/cm² was applied. At this time, between the end plate 39 and the first separator plate 1, the face pressure is distributed in the range of ±0.1 kg/cm² as shown in FIG. 8. The distribution is better than that in the case shown in FIG. 9 where annular elastic members 37 of one kind are used. In actual operation, an average cell resistance multiplied by the electrode area was 60 mΩcm² or maintained at a value which is smaller by 5%. Also the cell performance was (the latter half of 0.68 V) at 500 mA/cm² under the hydrogen/air and atmospheric conditions, i.e. improved by several mV or more.

Among combinations of the outer diameters of the annular elastic members 37, those in which the diameter of the outer annular elastic member 37a is in the vicinity of 95% of the short side of the first separator plate 1 and that of the inner one (37b) is in the vicinity of 30 to 50% showed the best pressure distribution. In FIG. 7, the annular elastic members 37a and 37b of the diameters of the two kinds were used. It is a matter of course that, in the case where the stack has a larger area, the number of kinds can be increased. In the configuration of FIG. 7, when the spring constant of the selected one of the annular elastic members 37 is divided by the corresponding outer diameter, the quotient is 3.1. For the same deformation amount, the load applied to the unit peripheral length is identical. The face pressure distribution and the cell performance were checked while variously combining annular elastic members 37 of different spring constants. As a result, it was found that an excellent performance can be obtained when a ratio of quotients, each of which is obtained by dividing one of the elastic members by the spring constant of the member, is in the range from 1 to 0.8, to 1 to 1.2. The detailed description of the above is omitted.

EMBODIMENT 4

Figure 10:
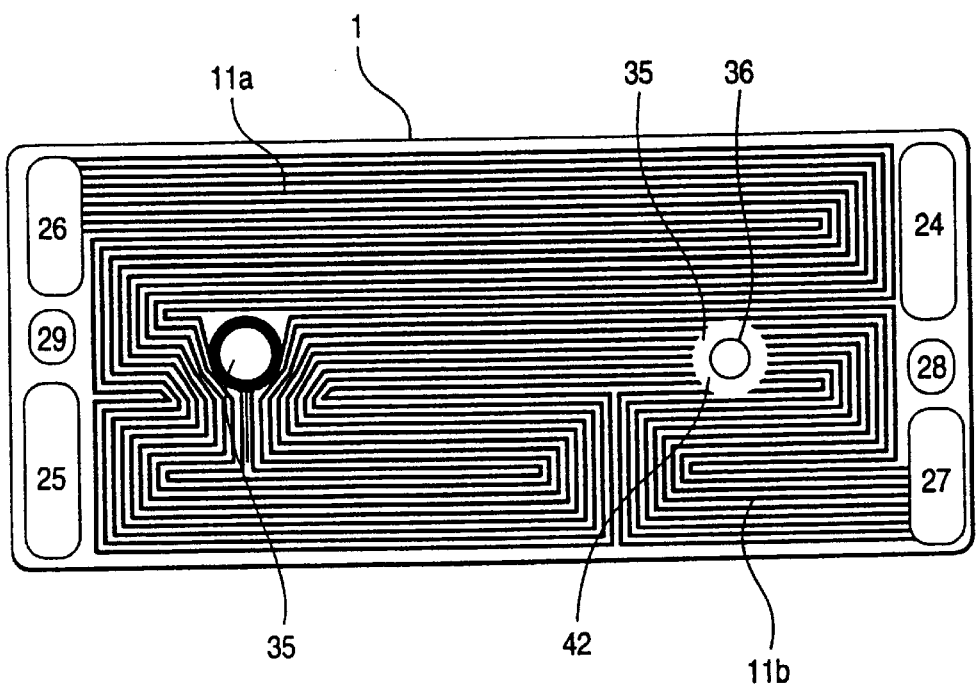
FIG. 10 is a plan of a separator plate of a fuel cell of Embodiment 4.
Figure 11:
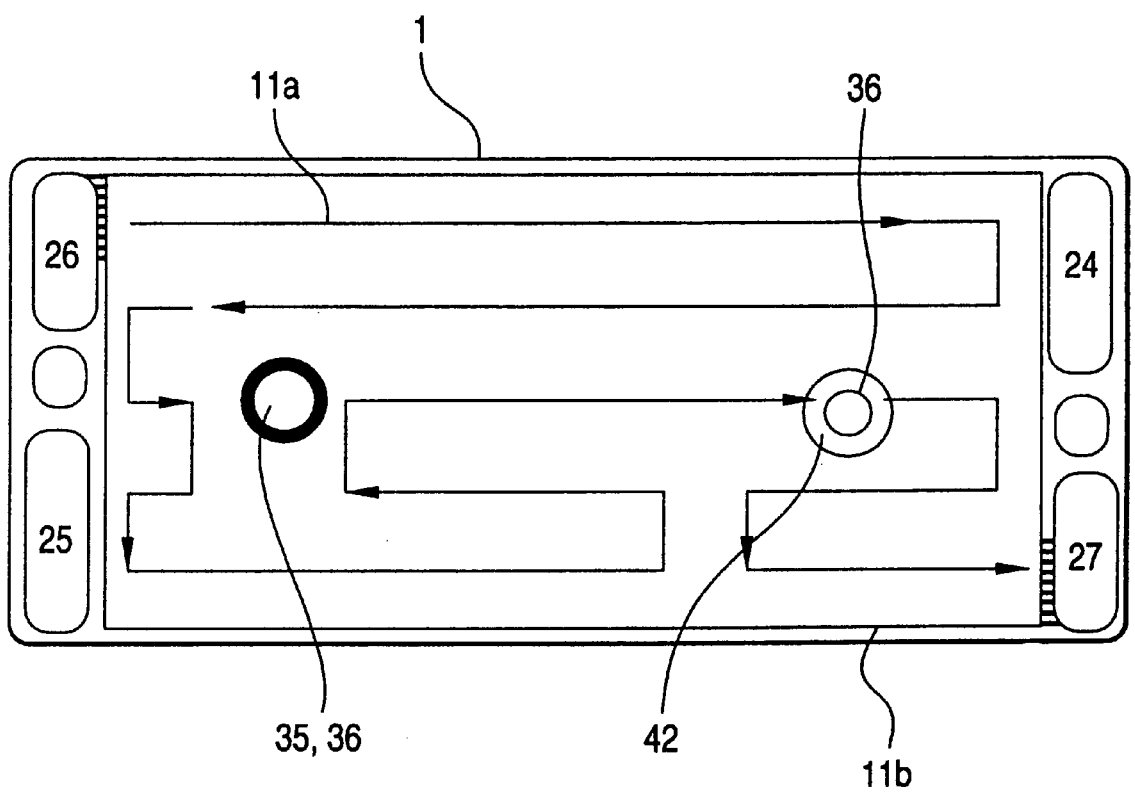
FIG. 11 is a diagram illustrating flow paths of the separator plate of FIG. 10.

FIG. 10 is a plan view of a separator plate of a fuel cell which is Embodiment 4 of the invention. In the figure, 42 denotes an intermediate manifold (referred to as a gas communication path). The intermediate manifold 42 is configured by a gap between a bolt 36 and one of through holes 35 when passing the bolt into the through holes. The diameter of the bolt is smaller than the inner diameter of the through hole. The reference numeral 11a denotes fuel flow paths. In order to facilitate understanding of the route along which the fuel flow paths 11a elongate, a diagram illustrating the route is shown in FIG. 11. As shown in FIG. 11, the fuel flow paths 11a are connected to the intermediate manifold 42, so that different flow paths in the same separator plate are collected into one path.

Figure 12:
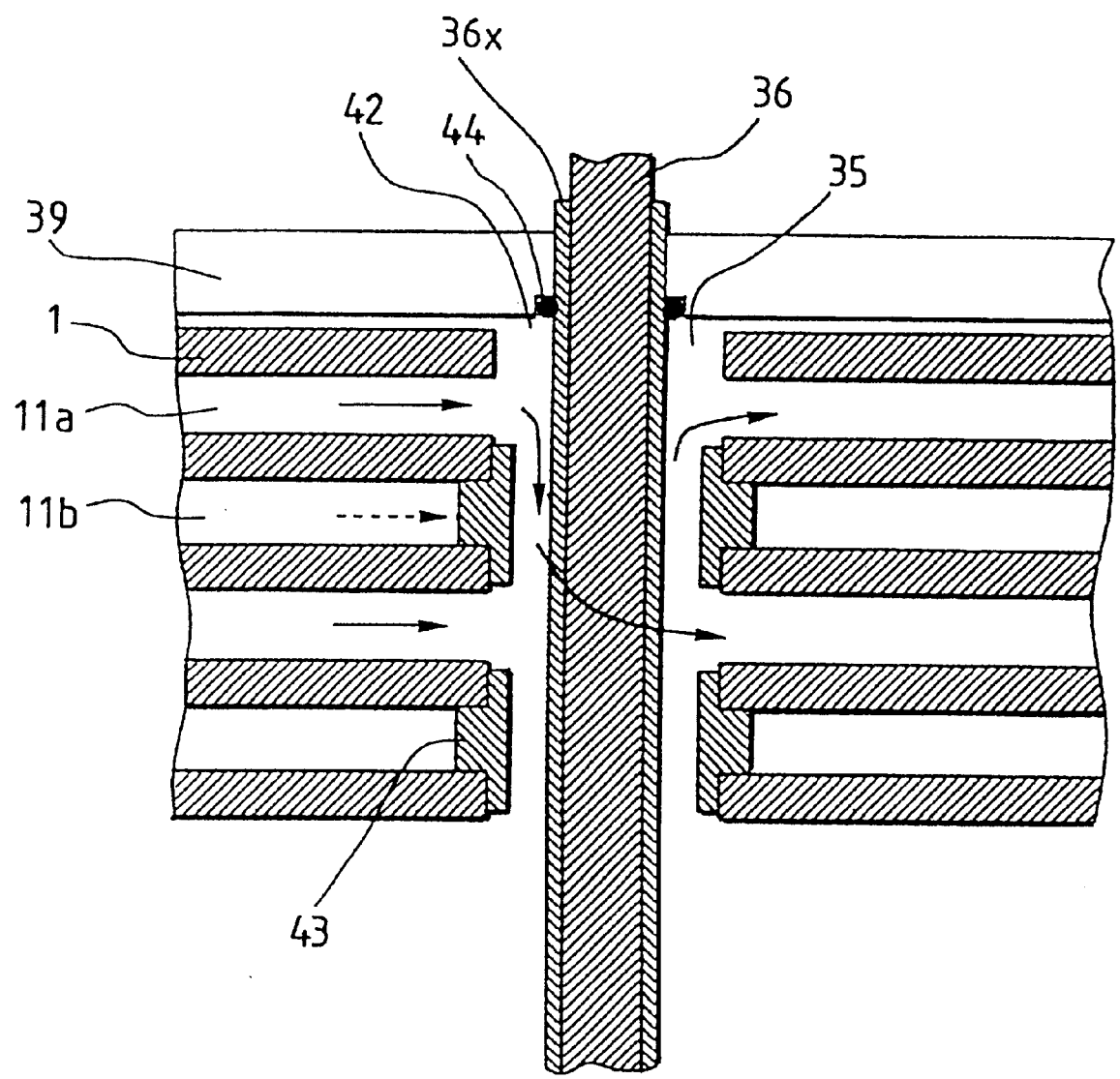
FIG. 12 is a sectional view of the fuel cell of FIG. 10.

In order to describe in detail the structure of the intermediate manifold 42, a sectional view of the intermediate manifold 42 is shown in FIG. 12. In the figure, 11a denotes the fuel flow paths, and 11b denotes air flow paths. The reference numeral 36X denotes an insulation material which covers the bolt 36. The outer diameter of the insulation material 36X is smaller than the inner diameter of the through hole 35, and hence the intermediate manifold 42 is configured between the insulation material 36X and the inner wall of the through hole 35. The reference numeral 43 denotes gas seals which are inserted into openings of the air flow paths 11b which open into the through hole 35, thereby preventing the air in the air flow paths 11b from flowing into the intermediate manifold 42. An O-ring 44 is inserted into a portion where the bolt 36 is contacted with the end plate 39, so that the fuel gas in the intermediate manifold 42 is prevented from flowing out to the exterior.

Figure 13:
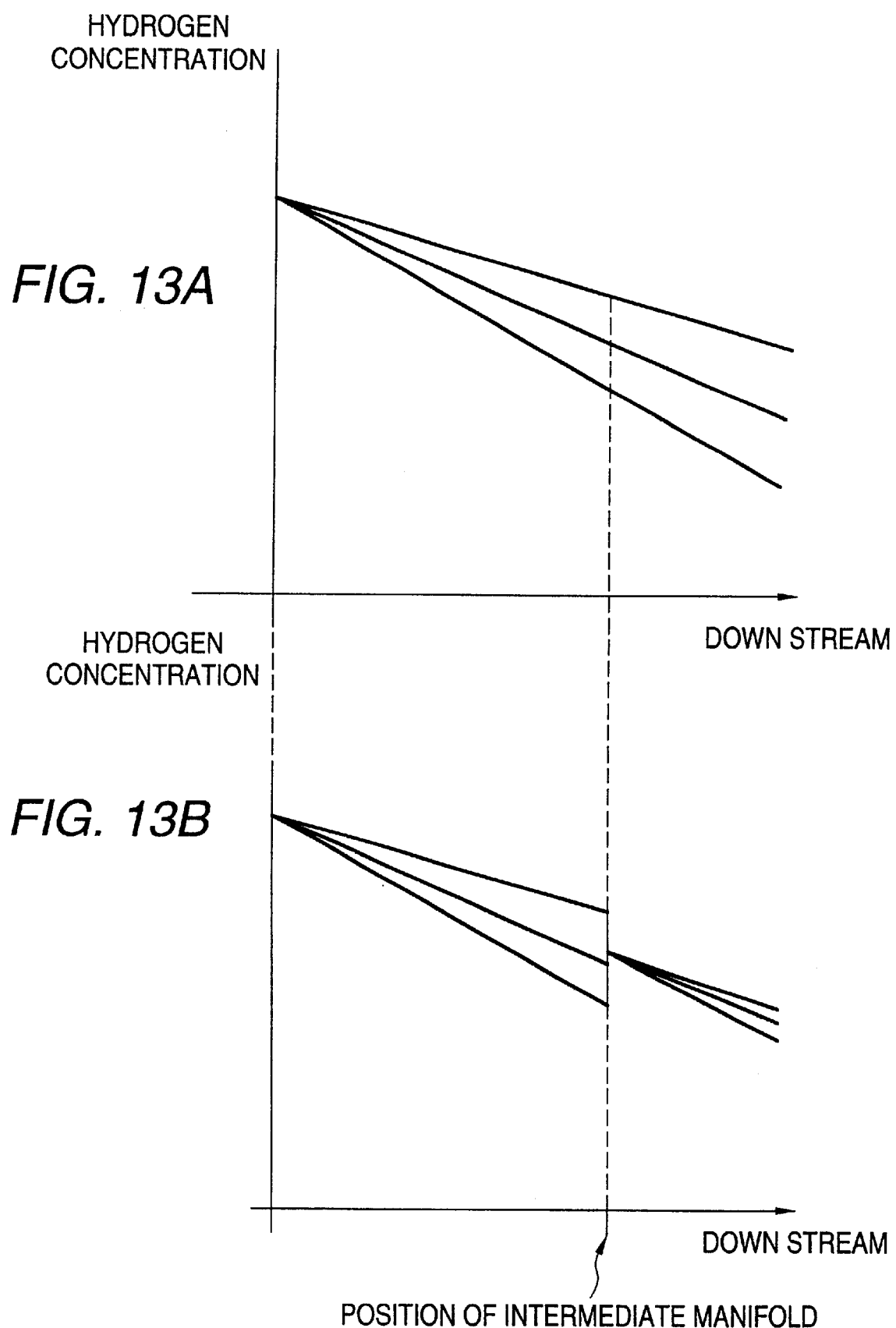
FIGS. 13A and 13B are diagrams illustrating the performance of the fuel cell of FIG. 10.

Next, the operation will be described. The fuel gas flowing into through a fuel supply port 26 flows in the separator plate 1 along the fuel flow paths 11a, and then flows out through a discharge port 27. During this flow, the fuel is gradually consumed in accordance with a reaction, flowing toward the downstream side. In the conventional art, when the concentration at the inlet is 75%, for example, the concentration at the outlet is lowered to about 47% (in the case where the fuel utilization factor is 70%). Furthermore, the fuel utilization factor is slightly varied depending on the separators or the flow paths. When the concentration with respect to the length of a flow path is shown in the form of a graph, therefore, the concentration is dispersed more as the fuel further advances toward the downstream side, as shown in FIG. 13A. Both of FIGS. 13A and 13B show the concentrations in three first separator plate 1 (or the concentrations in three flow paths). In the configuration of FIG. 10, the intermediate manifold 42 exists in a position which is at about ⅔ of the whole length of the flow path starting from the inlet. As shown in FIG. 13A, the concentration in the position is dispersed in the range of about 30 to 50%.

As described with reference to the conventional art example, when the amount of the gas flowing through each stack is dispersed (in this case, also the concentration is naturally dispersed), the performance of the whole of the cell is lowered as a result of the low performance of a single cell in which the flow amount is low. Depending on the situations, a shortage of hydrogen may cause fatal damage (which is unrecoverable). By contrast, in the intermediate manifold 42, the flow paths of each separator plate are once commonly connected, and hence the fuel gas is mixed, so that the concentration is made uniform. As shown in FIG. 13B, therefore, the concentration in the fuel flow paths 11a is uniform, at an average value. Downstream from the manifold, the difference in concentration is again gradually increased depending on performance of the separators. However, the fuel gas reaches the outlet before the difference becomes large, because the remaining length is short.

Figure 14:
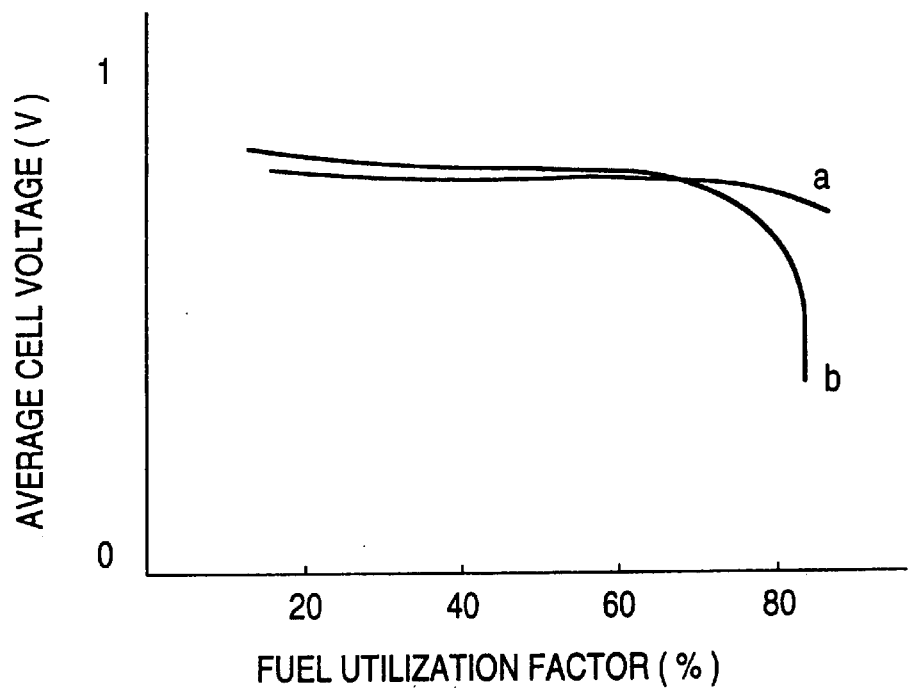
FIG. 14 is a graph illustrating the performance of the fuel cell of FIG. 10.
Figure 15:
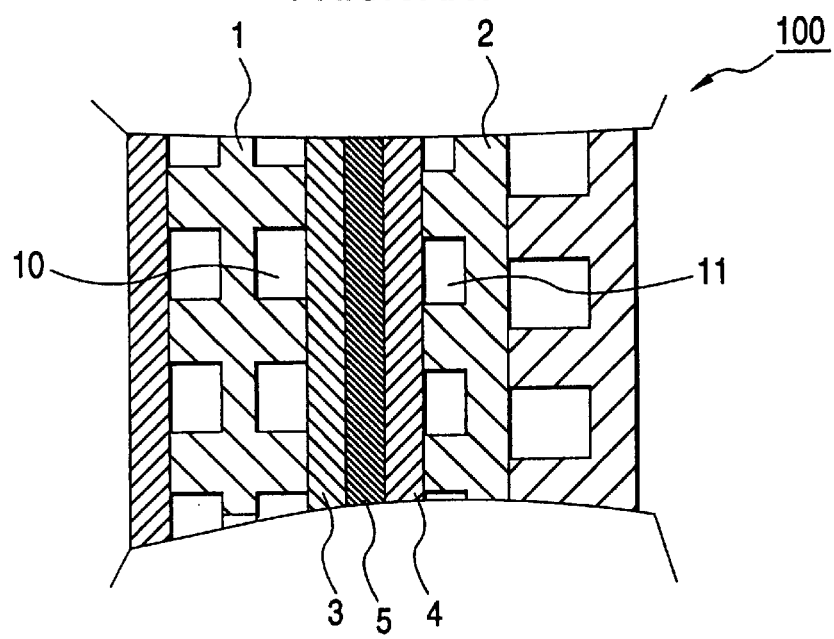
FIG. 15 is a sectional view of a fuel cell of the conventional art.
Figure 16:
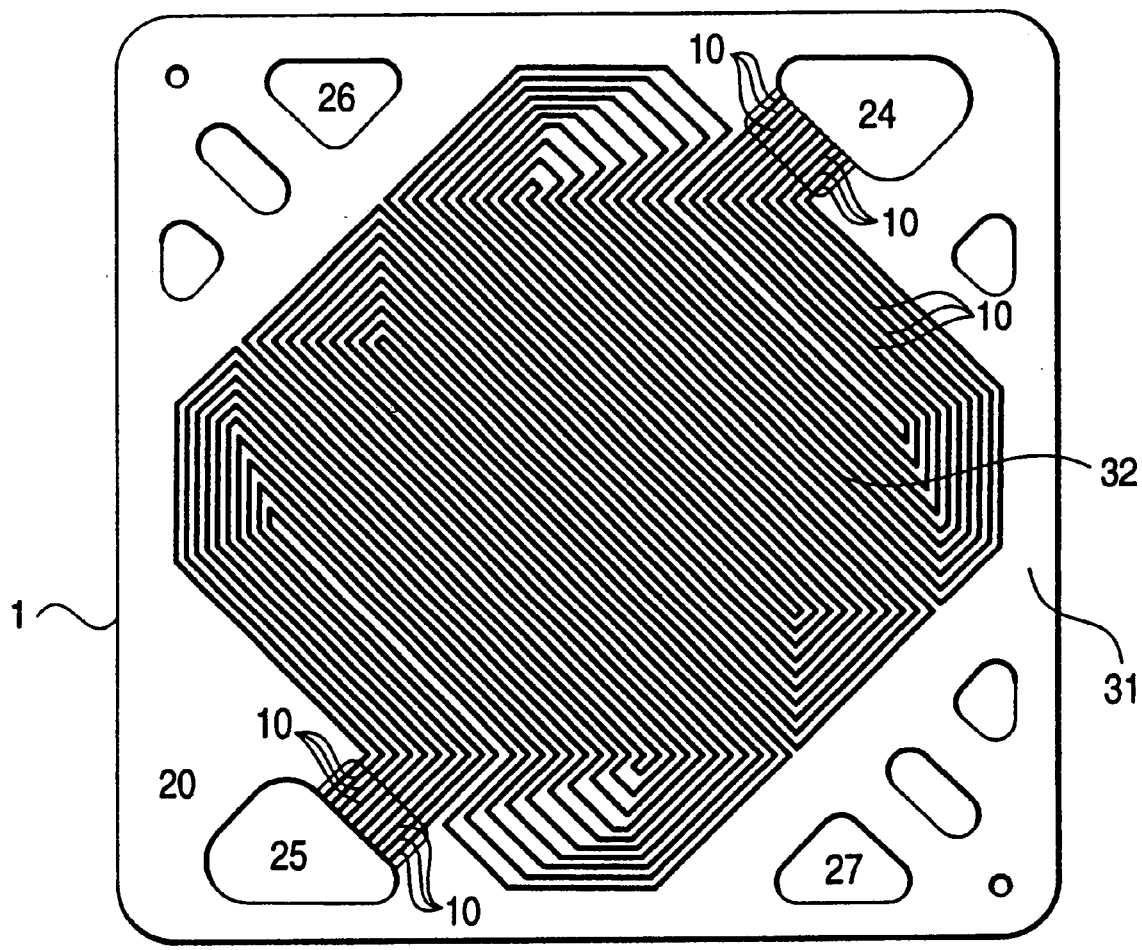
FIG. 16 is a plan view of a separator plate of the fuel cell of the conventional art.
Figure 17:
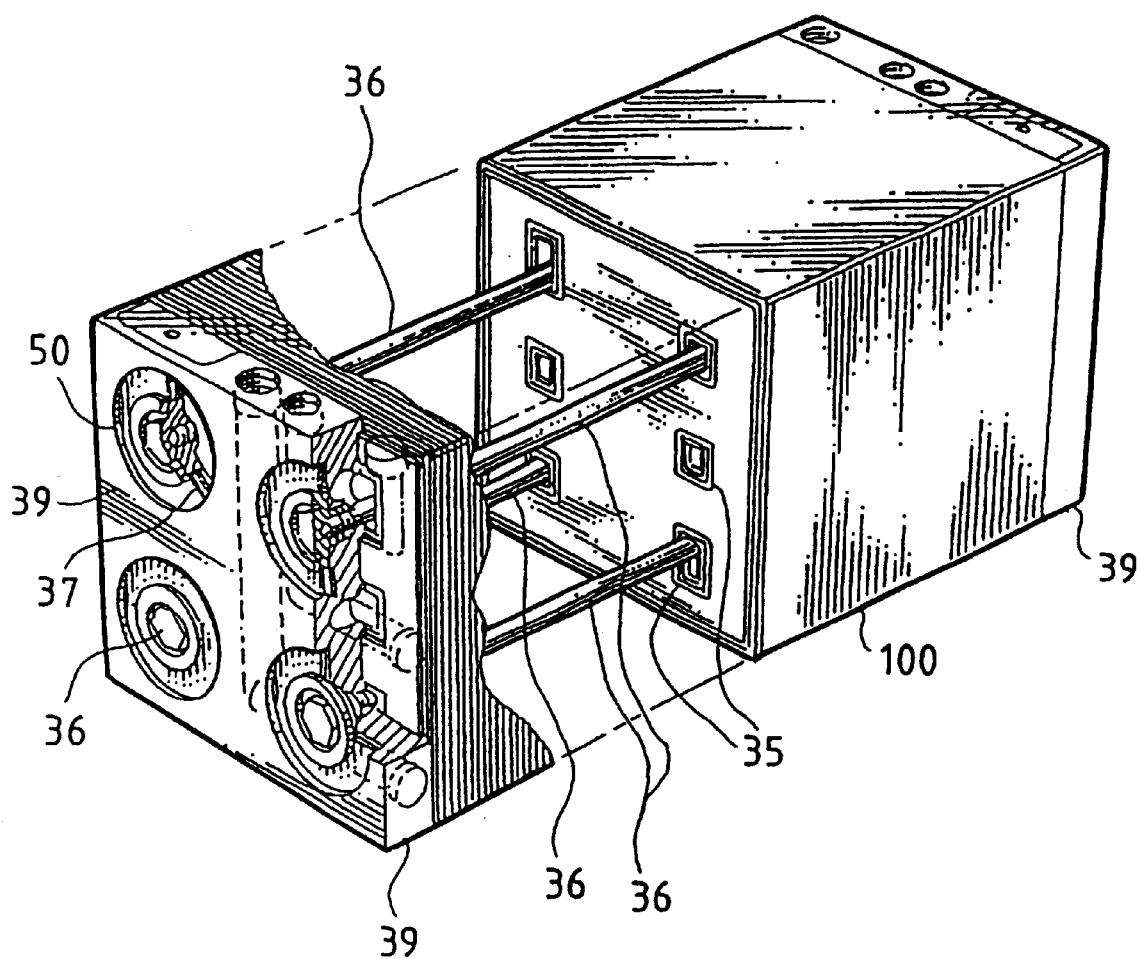
FIG. 17 is a diagram showing the configuration of the fuel cell of the conventional art.

FIG. 14 shows results of a study which was conducted on the dependency of the cell performance (the average cell voltage) on the fuel utilization factor while current (load) flowing through a cell is constant and changing the fuel concentration to change the fuel utilization factor in the cell. In the figure, a shows a case where the intermediate manifold 42 of the embodiment was present, and b shows a case where the intermediate manifold 42 was not present. In b, the performance of a part of stacked cells was suddenly lowered in the vicinity of a fuel utilization factor of 70% or more, so that also the average cell performance is largely reduced. At a fuel utilization factor of 80% or more, it is substantially impossible to operate the cell. A fuel cell in which the performance is once lowered causes a significant fault which cannot be recovered even when a sufficient amount of fuel is supplied later.

On the other hand, in the case a where the intermediate manifold 42 was present, when the fuel utilization factor is not larger than 60%, the performance is slightly lowered by the reduction of the electrode area due to the intermediate manifold 42, but a stable high cell voltage is obtained even when the fuel utilization factor exceeds 80%.

In the above, the configuration in which the fuel flow paths of each separator plate communicate with one another through the intermediate manifold 42 has been described. Another intermediate manifold through which the air flow paths of each separator plate communicate with one another may be used, so as to cope with a shortage of the oxidant due to clogging of an air flow path.

As described above, in the fuel cell of the invention, when the long side of a separator plate is divided into n equal parts, n is selected so that the dimensions are not larger than $2^{1/2}$ times the length of the short side and not smaller than $½^{1/2}$ times, bolts pass through substantially center areas of second rectangles which are formed as a result of the division of the long side into n parts, and the separator plate and a single cell are fastened via an annular elastic member. Therefore, it is possible to provide a fuel cell in which the face pressure can be maintained within a constant range with a minimum area loss, and which has excellent performance.

When a minimum one of integers of the n is selected, the effective electrode area can be ensured while minimizing the number of the bolts. Consequently, it is possible to provide a fuel cell having excellent performance.

The outer diameter of the annular elastic member is not larger than 90% of the short side of the second rectangles which are obtained as a result of the division, and not smaller than 50% of the long side of the second rectangles. Therefore, it is possible to provide a fuel cell in which the face pressure can be maintained within a predetermined range, and which has excellent performance.

In annular elastic member, disc springs of two or more kinds and having different outer diameters are coaxially attached. Therefore, it is possible to provide a fuel cell in which variation of the face pressure is further reduced, and which has excellent performance.

When a ratio of quotients of divisions in which spring constants of the disc springs coaxially attached and having different outer diameters are divided by respective outer diameters is in a range from 1 to 0.8, to 1 to 1.2, it is possible to provide a fuel cell in which dispersion of the face pressure is suppressed, and which has further excellent performance.

A gas communication path through which the fuel flow paths of different separator plates are connected to one another or the air flow paths of different separator plates are connected to one another is formed between the inner wall of the through hole formed in the separator plate and the bolt. Therefore, the concentration difference in the gas or air (oxidant) flowing through the flow paths of different separator plates can be reduced, so that a shortage of the fuel gas is prevented from occurring. As a result, the performance of the fuel cell can be improved.

Through the gas communication path, the fuel gas flow paths of the same separator plate communicate with one another or the air flow paths of the same separator plate communicate with one another. Therefore, the concentration difference in the gas or air (oxidant) flowing through the different flow paths of the separator plate can be reduced. Even when a flow path is clogged, the gas can be supplied to the flow path in the downstream from the gas communication path. As a result, the performance of the fuel cell can be improved.

What is claimed is:

1. A fuel cell comprising:
   a rectangular single cell including a cathode and an anode with a rectangular electrolyte film sandwiched between said cathode and said anode, in which said cathode and said anode are substantially identical in shape with said electrolyte film, a ratio of a length of a long side to a length of a short side in said electrolyte film being not less than $2^{1/2}$;
   a stack including: a first separator plate disposed adjacent to said cathode and having oxidant flow paths through which an oxidant fluid is supplied; and a second separator plate disposed adjacent to said anode and having fuel flow paths through which a fuel fluid is supplied, wherein a plurality of through holes are respectively defined at substantially center areas of a plurality of second rectangles, said plurality of through holes passing through said stack, said plurality of second rectangles being defined as a result of dividing a long side of said single cell of said stack into n equal parts, the n being selected so that the parts are not larger than $2^{1/2}$ times a length of the short side and not smaller than $\frac{1}{2}^{1/2}$ times; and
   a plurality of bolts passing through said plurality of through holes, respectively, and having an annular elastic member in at least one end of each of said plurality of bolts, and which fasten said stack via said annular elastic member.

2. A fuel cell according to claim 1, wherein a minimum one of integers which satisfy that, when the long side of said rectangular single cell of said stack is divided into n equal parts, the parts are not larger than $2^{1/2}$ times a length of the short side and not smaller than $\frac{1}{2}^{1/2}$ times is selected as the n.

3. A fuel cell according to claim 2, wherein an outer diameter of said annular elastic member is not larger than 90% of a short side of said second rectangles which are obtained as a result of the division, and not smaller than 50% of a long side of said second rectangles.

4. A fuel cell according to claim 1, wherein said annular elastic member is a member in which disc springs of two or more kinds and having different outer diameters are coaxially attached.

5. A fuel cell according to claim 4, wherein a ratio of quotients of divisions in which spring constants of said disc springs having different outer diameters are divided by respective outer diameters is in a range from 1 to 0.8, to 1 to 1.2.

6. A fuel cell according to claim 1, wherein a diameter of said bolt passing through corresponding one of said through holes is smaller than a diameter of an inner wall of corresponding one of said through holes, whereby a gas communication path through which fuel flow paths of different separator plates are connected to one other or oxidant flow paths of different separator plates are connected to one other is formed between said inner wall and said bolt.

7. A fuel cell according to claim 6, wherein oxidant flow paths of a same separator plate communicate with one another through said gas communication path or fuel flow paths of a same separator plate communicate with one another through said gas communication path.

8. A fuel cell comprising:
   a rectangular cell including a cathode and an anode and a rectangular electrolyte film sandwiched between said cathode and said anode, said cathode, said anode, and said electrolyte film being substantially identical in shape and having first long sides and first short sides wherein said cathode, said anode, and said electrolyte film are divided into n identical smaller rectangles having second long sides and the first short sides, and n is selected so that the second long side divided by the first short side is not more than $2^{1/2}$ and not less than $\frac{1}{2}^{1/2}$;
   a first separator plate disposed adjacent to said cathode and having oxidant flow paths through which an oxidant is supplied;
   a second separator plate disposed adjacent to said anode and having fuel flow paths through which a fuel is supplied, and a through hole located substantially at a center of each of the smaller rectangles, the through holes passing through said cathode, said anode, said electrolyte film, and said first and second separator plates;
   respective bolts passing through the through holes; and
   annular elastic members located at at least one end of each of said bolts, said bolts fastening said cathode, said anode, said electrolyte film, and said first and second separator plates together in a stack through said annular elastic members.

9. The fuel cell according to claim 8 wherein, when the first long side is divided into an integer number of equal parts so that the second long sides are not longer than $2^{1/2}$ times and not smaller than $\frac{1}{2}^{1/2}$ times the first short sides, a minimum of the integers is selected as n.

10. The fuel cell according to claim 9, wherein said annular elastic member has an outer diameter not larger than ninety percent of the first short side, and not smaller than fifty percent of a second long side.

11. The fuel cell according to claim 8 wherein said annular elastic member includes at least two coaxial disc springs having respective, different outer diameters.

12. The fuel cell according to claim 11 wherein a ratio of spring constants of said disc springs having different outer diameters divided by the respective outer diameters is in a range from 1 to 0.8, to 1 to 1.2.

13. The fuel cell according to claim 8 wherein a diameter of said bolt passing through a corresponding one of the through holes is smaller than a diameter of an inner wall of the through hole, whereby a gas communication path for one of fuel and oxidant of different separator plates is formed between said inner wall and said bolt.

14. The fuel cell according to claim 13 wherein one of oxidant flow paths and fuel flow paths of a separator plate communicate through the gas communication path.

* * * * *